United States Patent [19]
Bell

[11] 3,734,292
[45] May 22, 1973

[54] FUEL PUMP

[76] Inventor: Rupert B. Bell, 15318 Mack Avenue, Grosse Pointe, Mich.

[22] Filed: Nov. 18, 1970

[21] Appl. No.: 90,661

[52] U.S. Cl. ................210/172, 210/409, 210/416, 210/460, 417/370
[51] Int. Cl. .............................................B01d 35/02
[58] Field of Search..................210/172, 416, 130, 210/136, 460, 462, 409; 417/370

[56] References Cited

UNITED STATES PATENTS

| | | | |
|---|---|---|---|
| 2,757,800 | 8/1956 | Kucera | 210/409 X |
| 2,368,883 | 2/1945 | Roth | 417/370 X |
| 3,294,025 | 12/1966 | Niemeyer et al. | 210/416 |
| 2,788,125 | 4/1957 | Webb | 210/172 |

*Primary Examiner*—John Adee
*Attorney*—Harness, Dickey & Pierce

[57] ABSTRACT

A vehicle fuel system including a fuel tank pick up filter adapted to remove water and other foreign material, a fuel pump having a continuous flow therethrough and providing fuel to the carburetor at a desired pressure, and bypass passage means permitting the recirculation of fuel by said pump bypassing said filter thereby enabling the latter to be self-cleaned by the wave action and sloshing of fuel in the fuel tank. The pump is an electric pump having an internal bypass passage bypassing the filter.

3 Claims, 2 Drawing Figures

Patented May 22, 1973 3,734,292
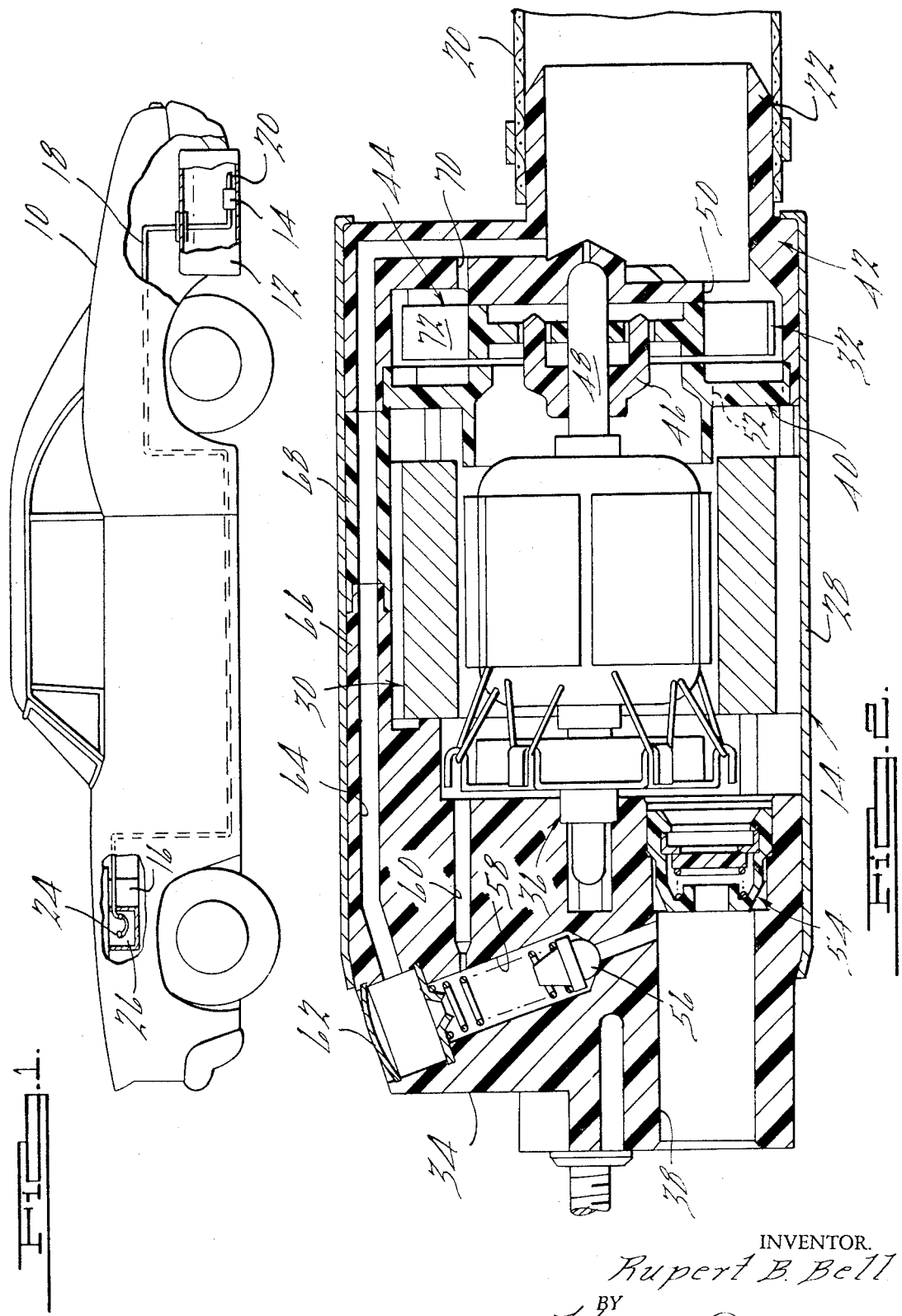
INVENTOR.
Rupert B. Bell
BY
Harness, Dickey & Pierce
ATTORNEYS

FUEL PUMP

BACKGROUND OF THE INVENTION

This invention relates generally to automotive vehicle fuel systems and more particularly to an improved fuel system in which the fuel pump provides a continuous flow of fuel and the filter in the fuel tank is self-cleaning. It also relates to an improved electric fuel pump. A fuel system of this type is shown, for example, in U.S. Pat. No. 3,418,991 granted Dec. 31, 1968 to General Motors Corporation on application of John E. Shultz et al.

For several years the automotive industry has used a filter on the fuel pick up line in the fuel tank for filtering out water and other foreign material. One example of a filter on the fuel pick up tube is shown in Webb U.S. Pat. No. 2,788,125. Filters on the pick up tube have been self-cleaning in systems in which, when the carburetor needle closes, the flow through the fuel pump drops to zero causing the flow through and pressure drop at the filter to drop to zero. This permitted the wave action or slosh of the fuel in the fuel tank to clean the filter.

Also, modern automotive practices, including the advent of automobile airconditioning and exhaust emission control systems, have produced conditions causing hot fuel handling problems and partial boiling or vaporization of the fuel resulting in a condition commonly known as vapor lock. To correct this problem it has been common practice to employ a fuel return line from the engine back to the fuel tank which bypasses a portion of the fuel from the pressure side of the fuel pump. This provides a continual flow which prevents the fuel from overheating. One such system is shown in Rike et al. U.S. Pat. No. 2,367,055. In these bypass systems, however, in which fuel is continually bypassed back to the fuel tank, the flow through the fuel pump and through the filter in the fuel tank never goes to zero and effective self-cleaning is prevented.

Another line of attack taken in solving the vapor lock problem is the use of an electric fuel pump suspended in the fuel tank which provides a supply of fuel under a positive pressure. The earlier mentioned Shultz et al. U.S. Pat. No. 3,418,991 shows such a system. This system, however, is also subject to the disadvantage that the filter in the fuel tank will not effectively self-clean because there is a continual flow through it resulting from the return of fuel from the pump to the tank past the pressure relief valve. Also in systems of this type, when the fuel level gets low and the pump starts to suck air, the fuel line between the carburetor and the fuel pump accumulates air bubbles. To eliminate these problems it is known, with this type of pump, to put a small bleed hole on the pressure side of the pump bypassing fuel and air back into the fuel tank. With this bleed hole bypassing fuel the pressure drop across the filter and flow through it are never reduced to zero and accordingly the filter is not properly cleaned by the wave action.

Accordingly, it is an object of the present invention to provide an improved fuel system in which there is a continuous flow through the fuel pump and in which when the carburetor needle valve closes, the flow through the fuel filter at the fuel pick up in the fuel tank drops to zero thereby enabling the fuel filter to be self-cleaned by the wave action and slosh of the fuel in the fuel tank.

It is also an object of the invention to provide an improved fuel pump system in which the fuel pump may recirculate fuel through a filterless circuit bypassing the filter in the fuel tank so that there is no flow through that filter permitting it to be cleaned by the wave action in the fuel tank.

Also, it is an object of the present invention to provide an improved electric fuel pump which may, if desired, be suspended in a fuel tank and which enables the fuel filter on the fuel pick up of the system in which it is used to be self-cleaning.

A further object of the invention is to provide an improved fuel pump for use in a vehicle fuel system including a fuel tank, a fuel filter in the fuel tank and fuel feeding means and in which the fuel pump is provided with a recirculating passage connecting its high pressure side to its low pressure side permitting the pump to recirculate fuel therethrough without the recirculated fuel passing through the filter in the fuel tank.

Another object of the invention is to provide an improved electric fuel pump which may, if desired, be suspended in a fuel tank and which draws fuel therefrom through a fuel filter in the tank and delivers it to a carburetor or other fuel feeding device, the fuel pump including a recirculating passage connecting its outlet to its inlet and through which the pump may recirculate fuel without returning it to the fuel tank and without causing any flow of fuel through the filter in the fuel tank.

It is a further object of the invention to provide such an improved electric fuel pump which is simple in design, economical to manufacture, and reliable and efficient in operation.

Other and more detailed objects of the present invention will be apparent to those skilled in the art from a consideration of the following specification, the appended claims and the accompanying drawings wherein:

FIG. 1 is a broken diagrammatic view of an automobile having a fuel system of the type including an electric fuel pump suspended in the fuel tank and which embodies my invention;

FIG. 2 is an enlarged cross-sectional view of the fuel pump illustrated in FIG. 1 and showing a broken portion of the fuel filter mounted thereon.

Referring to the drawings, in the preferred embodiment of the invention illustrated, the automobile 10 has a fuel tank 12 in which in the preferred embodiment illustrated, is suspended a fuel pump 14 which supplies fuel to the carburetor 16 through the fuel line 18. The fuel pick up is through the filter 20 mounted on a tubular extension 22 providing the inlet to the pump 14. The carburetor 16 is representative of any suitable means for feeding fuel to the engine and includes a float operated needle valve 24 that controls the flow of fuel from the fuel line 18 to a float chamber 26 of the carburetor to maintain a desired fuel level therein. The filter 20 may be of any suitable construction and in the preferred embodiment is adapted to remove water as well as other foreign material from the fuel as it flows therethrough.

Referring to FIG. 2, the electric fuel pump assembly generally indicated at 14 comprises a cylindrical housing 28 within which is a generally centrally disposed electric motor 30, a peripheral pump 32 in the inlet or right hand end as viewed in FIG. 2, and in the opposite or outlet end is an end cover 34 which carries a brush assembly generally indicated at 36. The end cover 34 is provided with an outlet passage 38 which is connected to the carburetor through the fuel line 18.

The pump 32 comprises a casing 40 and a cover 42 which cooperate to house an impeller 44. In operation of the fuel pump 32 the impeller 44 is driven by the motor 30 through a driver element 46 mounted on the armature shaft 48 and fuel is drawn through the tubular inlet 22 and into the pump 32 through an inlet port 50 formed in the cover 42 and is forced from the pump 32 through the outlet port 52. The fuel thence passes around and through the motor 30 providing cleansing, lubrication and cooling. The fuel flowing around the motor 30 is directed to the outlet passage 38 in the end cover 34 in which is mounted the check valve 54. The cover 34 also houses a pressure relief valve 56 adjusted to maintain a desired pressure in the outlet passage 38. The pressure relief valve 56 is housed in a stepped passage 58 and fuel passing through the motor 30 is discharged into this passage 58 through a passage 60 provided in the end cover 34.

The outlet end of the passage 58 is suitably closed, as by a welch plug 62. The fuel flowing into the passage 58 is returned to the interior of the inlet extension 22 through a bypass passage 64 formed in the end cover 34, the casing 40 and the cover 42. To provide for this passage 64 the end cover 34 and the casing 40 have interfitting portions 66 and 68 through which the bypass passage 64 extends.

Also communicating with the bypass passage 64 is a vent passage 70 formed in the cover 42 and located at the top of the pump 32 at the root or base of the vanes 72 of the impeller 44 to provide static purging and to aid in priming by quickly exhausting the less dense vaporized fuel which tends to collect at that point.

It will now be appreciated that in the above described fuel system when the carburetor needle valve 24 is closed and there is no flow of fuel from the outlet passage 38 into the fuel line 18, there will be no flow of fuel through the filter 20 thereby permitting it to be self-cleaned by the wave action and sloshing of the fuel in the fuel tank. This is for the reason that under these conditions all fuel flowing from the pump 32 passes into the bypass passage 64 either through the pressure relief valve passage 58, the passage 60 and then the passage 58, or the vent passage 70, and from this bypass passage 64 the fuel passes through the interior of the inlet extension 22 and to the pump inlet port 50 without passing through the filter 20.

The details of the electric pump 14, except for the modifications to provide for the bypass passage 64 and the sealing of the outer end of the passage 58 by the welch plug 62 may be the same as shown and described in greater detail in the aforementioned Shultz et al. U.S. Pat. No. 3,418,991.

While only one embodiment of the invention has been illustrated and described in detail herein, it will be readily appreciated by those skilled in the art that numerous modifications and changes may be made without departing from the scope of the invention as defined in the appended claims.

I claim:

1. In an automotive vehicle fuel system, means for feeding a fuel mixture to the vehicle engine, means for stopping the flow of fuel to said fuel feeding means, a fuel tank for liquid fuel, a fuel pump having an inlet port, a fuel line for delivering fuel from said fuel pump to said fuel feeding means, fuel pick up filter means disposed in said fuel tank to be subjected to the sloshing action of the liquid fuel in said tank, a fuel inlet connecting said filter means to said pump for delivering fuel flowing through said filter means to said inlet port of said pump, and means for reducing the flow through and the pressure drop at the filter means to zero when said first named means stops the flow of fuel to said fuel feeding means so that the sloshing action of the liquid fuel on the filter means may wash the filter means, said reducing means comprising passage means effective when said first named means stops the flow of fuel to said fuel feeding means to return the fuel pumped by said pump to the interior of said fuel inlet without passing through said filter means.

2. In an automotive vehicle fuel system having means for feeding a fuel mixture to the vehicle engine including a valve for stopping the flow of fuel to said fuel feeding means and a tank for liquid fuel, a fuel pump for supplying fuel from the fuel tank to said fuel feeding means and having an inlet port, fuel pick up filter means disposed in said fuel tank and adapted to be subjected to the sloshing action of liquid fuel in said tank, a fuel inlet connecting said filter means to said pump for delivering fuel flowing through said filter means to said inlet port of said pump, means for reducing the flow through and the pressure drop at the filter means to zero when said valve closes to stop the flow of fuel to the fuel feeding means so that the sloshing action of the liquid fuel on the filter means may wash the filter means, said reducing means comprising means defining a passage effective when said valve stops the flow of fuel to said fuel feeding means to return the fuel pumped by the pump to the interior of the fuel inlet without passing through said filter means.

3. In an automotive vehicle fuel system having means for feeding a fuel mixture to the vehicle engine including a valve for stopping the flow of fuel to said fuel feeding means and a tank for liquid fuel, an electric fuel pump adapted to be disposed in said fuel tank for supplying fuel from the fuel tank to said fuel feeding means and having an inlet, filter means mounted on said fuel pump for filtering fuel flowing from said tank into said inlet and adapted to be subjected to the sloshing action of the liquid fuel in the tank, means for reducing the flow through and pressure drop at said filter means to zero when said valve stops the flow of fuel to said fuel feeding means so that the sloshing action of the liquid fuel on the filter means may wash the filter means, said reducing means comprising means on said fuel pump defining a passage effective when said valve stops the flow of fuel to said fuel feeding means to return the fuel pumped by the pump to the interior of said inlet without passing through said filter means.

* * * * *